United States Patent [19]

Gabriele

[11] 4,045,987

[45] Sept. 6, 1977

[54] GEAR ROLLING EQUIPMENT

[75] Inventor: Leonard A. Gabriele, Warren, Mich.

[73] Assignee: Lear Siegler, Inc., Santa Monica, Calif.

[21] Appl. No.: 663,062

[22] Filed: Mar. 2, 1976

[51] Int. Cl.² .............................................. B21H 5/04
[52] U.S. Cl. ......................................... 72/84; 72/102; 72/422; 90/1.6 R; 214/1 BD
[58] Field of Search ................... 29/159.2; 72/84, 102, 72/422; 90/1.6 R; 214/1 BD

[56] References Cited

U.S. PATENT DOCUMENTS

| | | | |
|---|---|---|---|
| 2,102,613 | 12/1937 | Cole | 90/73 |
| 3,468,435 | 9/1969 | Ellwanger et al. | 29/159.2 |
| 3,645,408 | 2/1972 | Bronzini | 214/1 BD |
| 3,805,353 | 4/1974 | Fountain et al. | 29/159.2 |
| 3,811,179 | 5/1974 | Anderson | 214/1 BD |

Primary Examiner—Lowell A. Larson
Attorney, Agent, or Firm—Whittemore, Hulbert & Belknap

[57] ABSTRACT

A machine for rolling hypoid gears, particularly pinions having a stem projecting from one side, in mesh with a tool in the form of a hypoid ring gear. Work pieces are provided at a preliminary loading station with their teeth located in a precisely predetermined angular position. From this station they are transported into alignment with a rotary work spindle which at this time is fixed against rotation in a random position. The gearlike tool is secured to a spindle which is fixed in a precisely located angular position so that the teeth of the gear and tool are in proper angular alignment. The gear is fixed on the work spindle and the work and tool spindles are relatively moved to mesh the gear and tool, after which both spindles are released for rotation and one spindle is positively driven in rotation.

5 Claims, 11 Drawing Figures

GEAR ROLLING EQUIPMENT

BRIEF SUMMARY OF THE INVENTION

The present invention relates to finish forming bevel gears, and particularly hypoid gears, by rolling them in mesh with a tool in the form of a mating bevel gear. The present invention is related to my copending application Ser. No. 656,255, filed Feb. 9, 1976.

In my prior application the invention was in rolling a ring gear, using a pinion as the rolling tool. In the present application the parts are reversed and the work piece is in the form of a pinion and the tool is in the form of a mating gear, preferably hypoid.

Means are provided for positively driving one of the spindles, preferably the tool spindle, in rotation and the meshed engagement between the gear and tool results in corresponding rotation of the work spindle.

During the rolling operation forces are applied to establish relatively heavy rolling pressure contact between the teeth of the gear and tool.

One of the problems in a machine as described in the foregoing is to provide automatic loading equipment in which the unfinished work pieces may simply be fed into the machine and will advance continuously therethrough, entering into proper mesh with the tool gear, and finally being advanced from the machine on suitably formed exit rails. This loading equipment must provide for movement of the successive work gears into full mesh with the tool without the possibility of engagement between the crests of the teeth of the gear and tool and consequent failure to mesh.

Automatic meshing engagement during the automatic loading of the machine is accomplished by mounting the tool on a tool spindle in a fixed position thereon, and, between gear rolling operations, fixing the location of the tool spindle so that its teeth occupy precisely predetermined angular positions. Conveniently, this is accomplished by shot bolt means.

At the same time, after a finished work gear is removed from the work spindle, the work spindle is positively maintained in a random angular position, as for example by the application of suitable brake means to the spindle in whatever position it happens to occupy at the conclusion of a rolling cycle.

Means are provided on the work spindle for fixing the work gear thereon against rotation so that the work gear is rotatable with the work spindle only after the brake means has been released.

In order to insure that the teeth of each work gear as it is located on the work spindle are in proper position to enter into full mesh with the teeth of the tool, means are provided for positioning each work gear as it advances in a fixed position in which its teeth are precisely mounted in the required angular position. This in general is accomplished by advancing each work gear along rail means into engagement with a series of resiliently mounted elements which will enter into engagement in the tooth spaces of the work gear. Conveniently, these elements may be in the form of balls mounted in leafspring means so that if they fail to engage in the tooth spaces of the work gear, they will be displaced against the action of the spring until such time as they drop into the tooth spaces.

The individual work gears are advanced along the rails by a feeding abutment which preferably engages the laterally projecting stem of a work gear in the form of a pinion. The work gears are guided for movement along a rectilinear path and the final position of each gear is determined by a locating abutment which determines its position in space while its angular position is determined by the locating elements as previously described.

At this time, to provide a final assurance that the gear is properly located a ball type locator mounted on a pivoted lever is moved into engagement with a tooth space. If for any reason the ball point of the locator fails to enter a tooth space, suitable limit switch means controlled by position of the pivoted arm insures that further operation of the machine is prevented until the difficulty is cured.

Having thus located a work gear in a precisely predetermined position in space and with the precisely predetermined angular position, the gear is now conveyed into alignment with the work spindle. Conveniently, the work spindle includes a chuck adapted to engage and grip the stem of the pinion.

In the present case the tool or die is in the form of a ring gear, preferably a hypoid ring gear, mounted for rotation with its axis vertical and carried by a vertically movable knee by means of which pressure may be applied between the teeth of the gear and tool. The tool spindle is driven in rotation by a suitable motor, preferably hydraulic, carried by the vertically movable knee, and the spindle, between successive rolling operations, is positively retained in a predetermined oriented position by suitable means such for example as a shot bolt.

The work support spindle is horizontal and is mounted for free rotation during a rolling cycle. The spindle has associated therewith a friction brake which is adapted to lock the work spindle against rotation in whatever random position it occupies following completion of a rolling operation.

The end of the work spindle includes a chuck into which the stem of the work gear pinion is inserted while the pinion is retained in positively oriented rotational position suitable for meshing directly with the teeth of the ring gear tool.

In order to position work gears sequentially in the chuck and to remove finished work gears and position them for subsequent discharge from the machine, the loading mechanism comprises a horizontally movable carriage composed of rigidly interconnected carriage members or heads. Each member has pivoted thereto for tilting movement about a horizontal axis a pivoted support. Each of the pivoted supports includes guide means on which is mounted a slide. Suitable means such for example as a piston and cylinder are connected between the pivoted support and the slide so that the slide is movable vertically on the pivoted support when the pivoted support is in its vertical position, and is movable horizontally on the pivoted support when the support is in its horizontal position.

The slide is provided with gripping jaws adapted to engage and positively support a work piece against rotation and to transport it in the loading operation.

In practice, the individual work pieces are advanced along a horizontal support with the stem extending downwardly. As the work gears advance they engage orienting elements such as spring pressed balls which rotate the individual work pieces until their forward advance is arrested by engagement with suitable abutment means. At this time a work gear is supported in a predetermined position, with its stem extending downwardly, and with its teeth precisely located or oriented in space.

At this time the horizontally movable carriage is positioned such that one of the pivoted supports is adjacent the work gear and the slide is vertically movable thereon. At this time the slide is moved downwardly and the jaws thereon engage the work piece. Thereafter, the slide is moved vertically to lift the work piece and at the same time or subsequently, the pivoted support is tilted to a horizontal position in which the axis of the work piece is in alignment with the chuck provided at the confronting end of the work spindle. At this time the slide is advanced to insert the spindle into the chuck which is then actuated to clamp the work piece in fixed position.

Thereafter, the knee is elevated moving the rolling tool in the form of a ring gear into mesh with the pinion, such meshed engagement occurring without interference due to the fact that the teeth of both the tool and gear are at this time positively maintained in the correct oriented position.

As soon as the teeth of the gear and tool have entered into mesh the friction brake provided on the work spindle is released and the shot bolt is disengaged from the tool spindle, and the tool spindle is driven in rotation by its own motor. Working pressure is applied between the teeth of the tool and pinion by means for a hydraulic piston and cylinder device connected to the vertically movable tool supporting knee.

During the rolling operation the slide on the loading support is retracted and the carriage is moved to bring the other carriage member or unloading member into alignment with the work spindle. After the rolling operation is completed the knee is moved downwardly to disengage the teeth of the gear and tool, and the tool spindle is locked in a predetermined angular position by suitable shot bolt means. The work spindle is retained in random oriented position by the application of brake means. At this time the slide on the unloading pivoted support, which at this time is horizontal, moves forwardly and engages the finished work piece. The slide then retracts and its pivoted support swings downwardly to vertical position, at which time the unloading slide moves downwardly to deposit the finished work piece on the discharge portion of the mechanism.

DETAILED DESCRIPTION

Figures 1, 6:
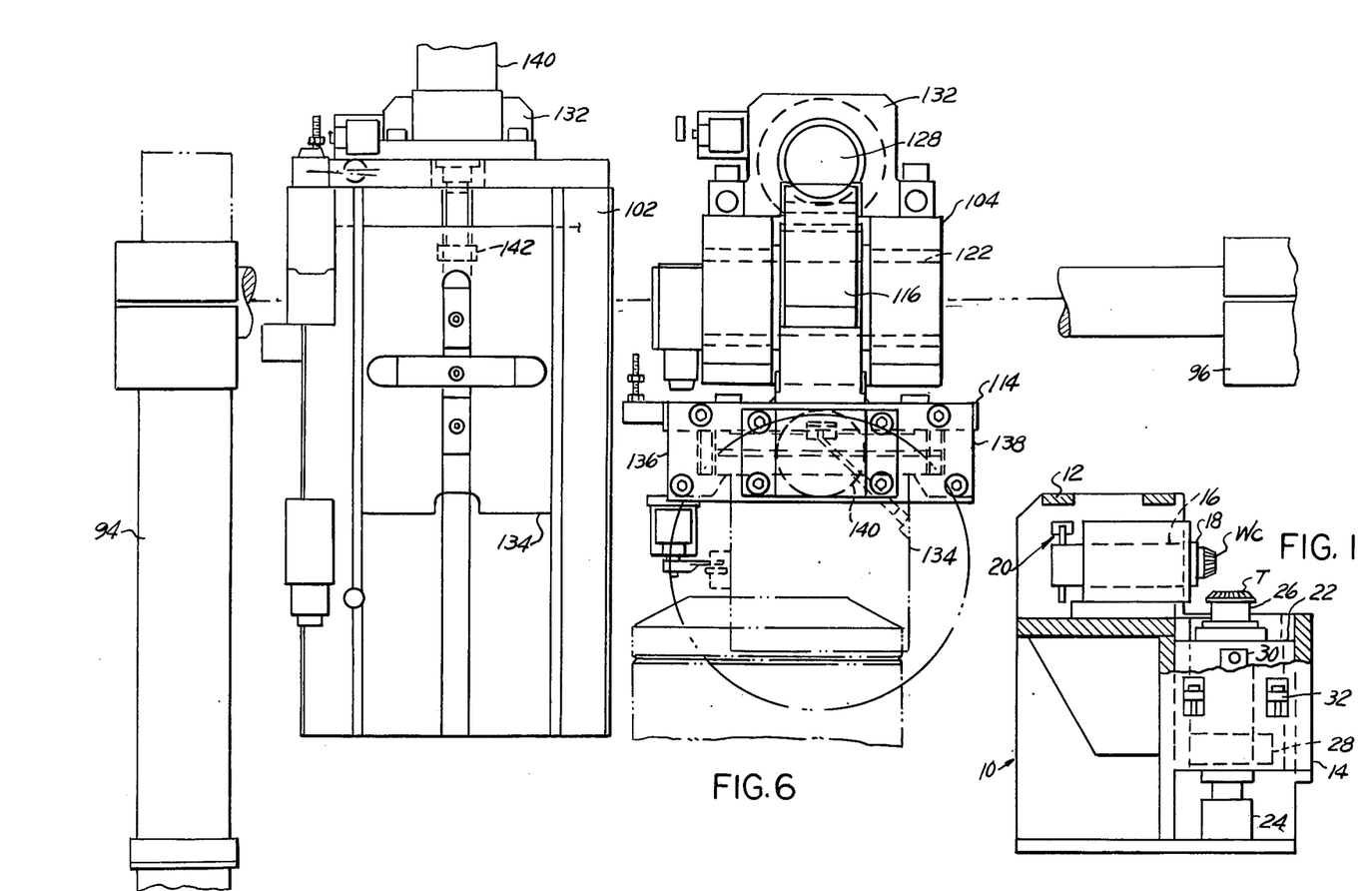
FIG. 1 is a simplified sectional view showing the relationship of parts of the rolling apparatus.
FIG. 6 is an elevational view of the loading and unloading mechanism.

The invention relates primarily to automatic loading equipment for a gear rolling machine of the type diagrammatically illustrated in FIG. 1. In this Figure there is illustrated a main frame 10 having a column 12 and a laterally extending base portion 14. In the column 12 there is provided a work support spindle 16 terminating at its forward end in a hydraulically operated clamping collect 18 adapted to grip and fixedly locate the stem of a work gear in the form of a hypoid pinion, here designated Wc. The spindle 16 is freely rotatable but is provided with a friction brake device diagrammatically illustrated at 20, which is adapted to retain the spindle 16 positively against rotation in whatever random position of rotation it happens to occupy upon termination of a finishing cycle.

Located within the base portion 14 is a vertically movable knee 22 connected to power means for elevating the knee to apply working pressure between the teeth of a work gear and a gear-like tool. This means is illustrated diagrammatically as comprising a hydraulic piston and cylinder device 24, and it is to be understood that this is capable of applying forces to the knee which will result in the application of pressure of metal forming intensity between the teeth of the gear and tool. A tool T, herein illustrated as in the form of a hypoid ring gear, is mounted on the upper end of a tool spindle 26 adapted to be driven in rotation by a motor 28 carried by the knee 22. The motor 28 is preferably a hydraulic motor and in operation drives the tool T directly and drives the work spindle 16 through the meshed engagement of the teeth of the tool T and the work gear W.

Suitable means are provided for fixing the tool spindle 26 in a precisely predetermined rotational position between successive gear finishing cycles. This means may conveniently comprise a shot bolt mechanism carried by the knee having a bolt element adapted to be projected into a matching recess in the tool spindle. The shot bolt is diagrammatically indicated at 30.

In addition, accurately adjustable abutment means indicated diagrammatically at 32 are provided to limit upward movement of the knee. Accordingly, by appropriate adjustment of the abutment means 32 the work gear W may be brought to a predetermined size independent of any variations in initial oversize, all of course within the limits of the machine.

Reference is now made to FIGS. 2-5 inclusive.

Figure 2:
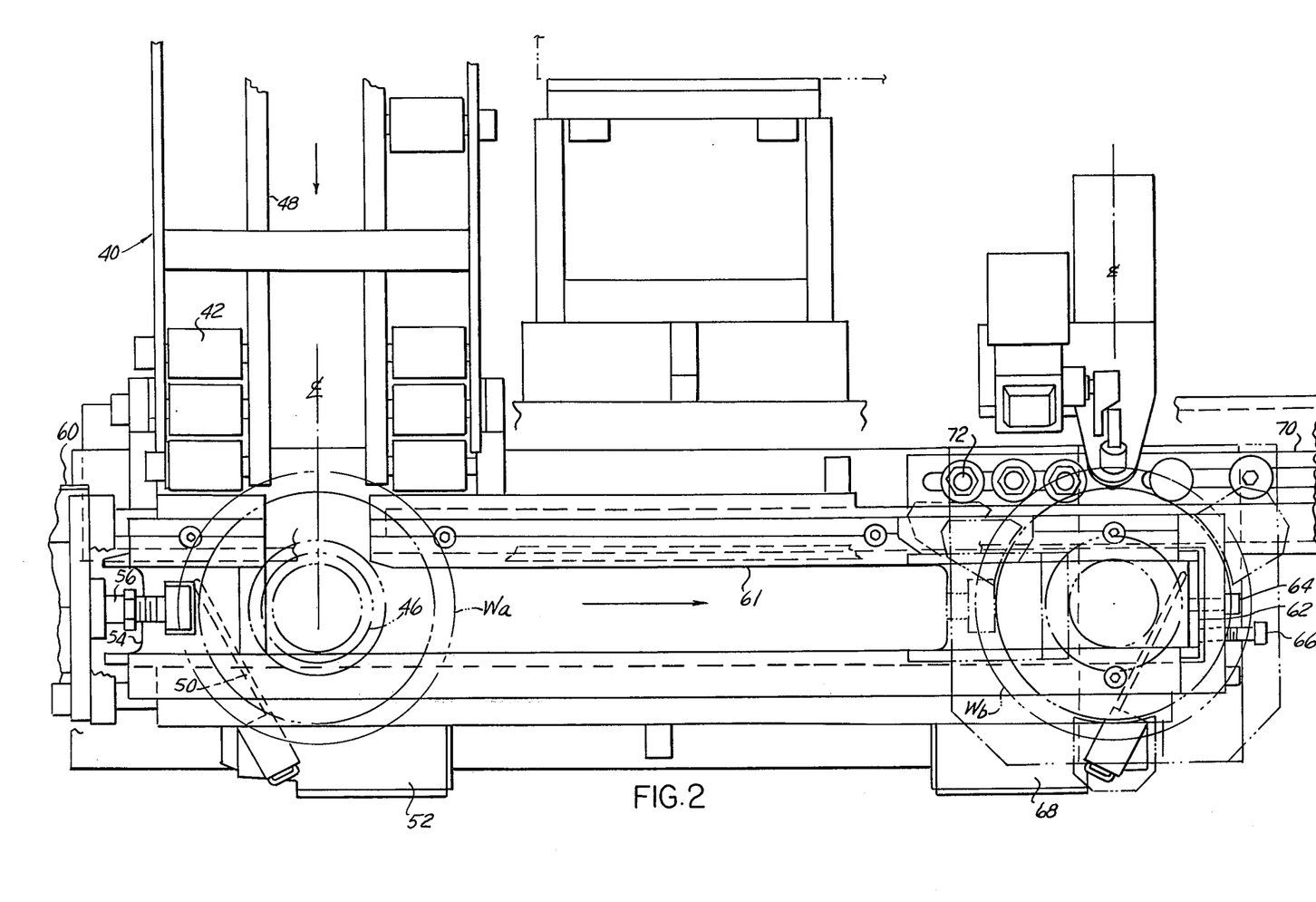
FIG. 2 is a plan view of the entry end of the loading mechanism.
Figure 3:
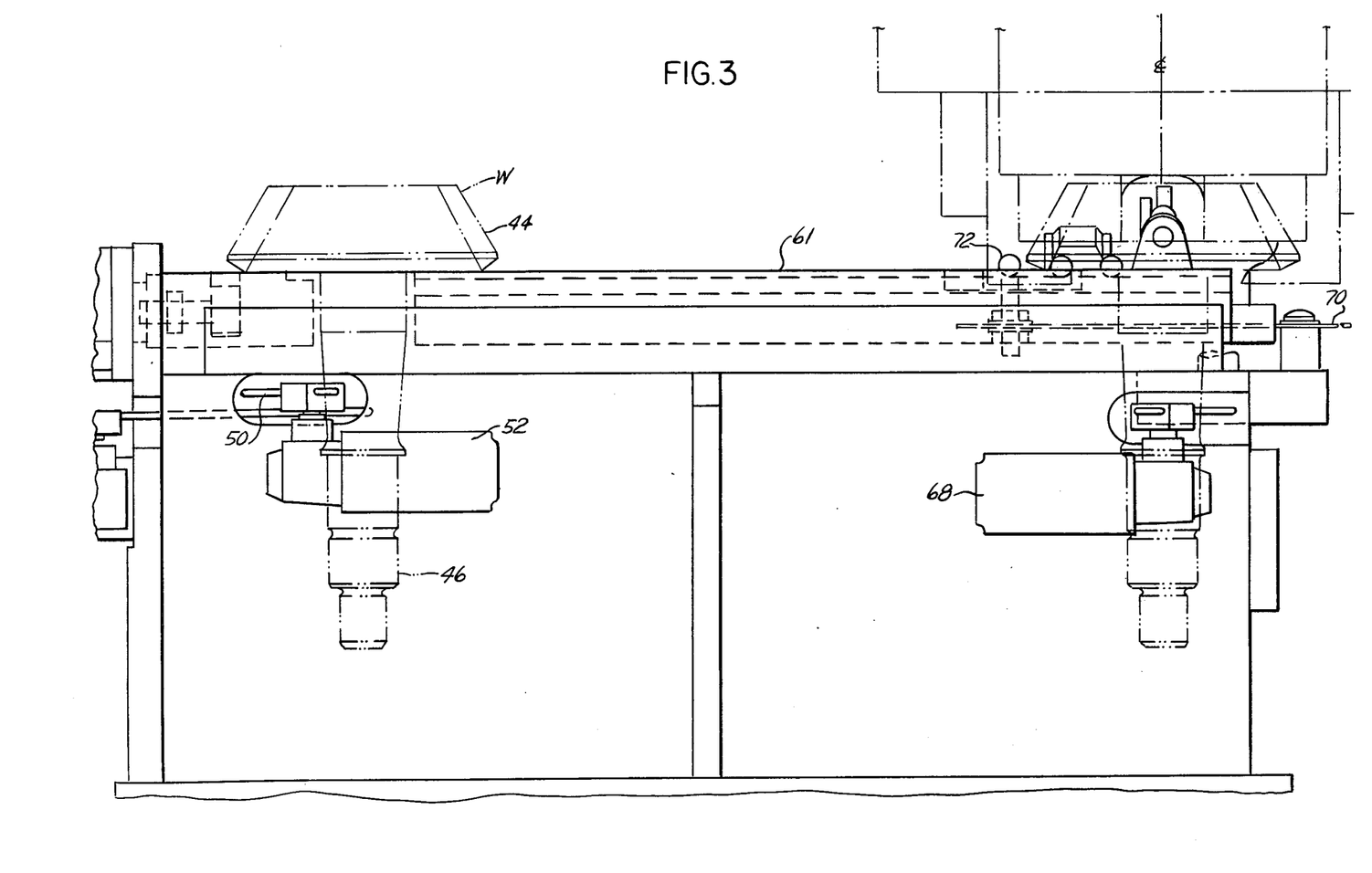
FIG. 3 is an elevational view of the structure shown in FIG. 2.
Figure 4:
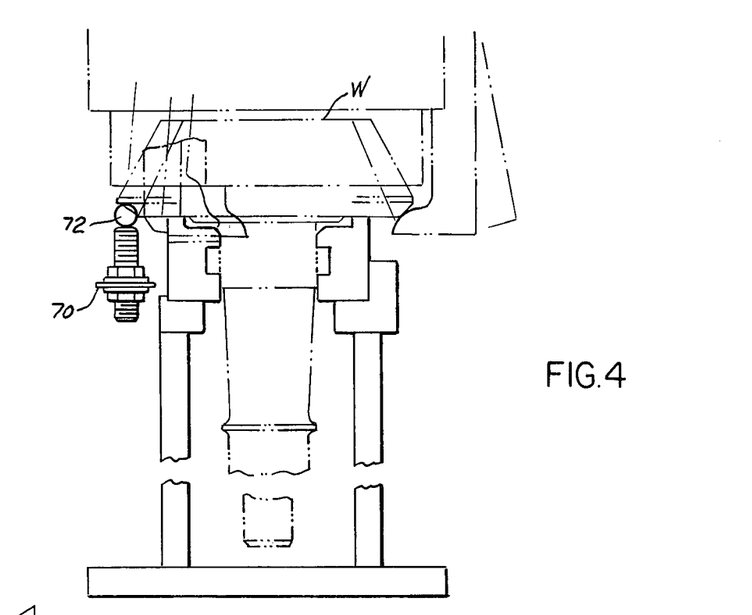
FIG. 4 is an elevational detailed view showing orientation of the work gear.

In FIG. 2 the loading mechanism comprises a slightly inclined input chute 40 preferably including a multiplicity of rollers 42 along which the work gear advances. The shape of the work gear W is best illustrated in FIG. 3 where it will be seen that it includes a gear portion 44 and a laterally projecting stem portion 46. In FIG. 2 the stem portion 46 traverses the open space indicated at 48 and the gear portion 44 moves along the rollers 42.

Suitable means (not illustrated) are provided for releasing the work gears one at a time and the foremost gear moves downardly into a position illustrated at Wa at which time it actuates the finger 50 of a limit switch 52. A pusher 54 is provided which is connected to a piston rod 56 of a hydraulic cylinder 60 which when energized shifts the pusher 54 to the right advancing the work gear W along rails 61. The pusher 54 engages the stem 46 of the work gear and moves it into engagement with an adjustable abutment 62 the location of which may be adjusted by screws 64 and 66. The position of the work gear at this time is indicated at Wb and its arrival at this position will be monitored by a limit switch 68.

During traverse of the work gear from the position Wa to the position Wb it is essential to insure that the rotational position of the work gear is precisely predetermined when it arrives at the position Wb. For this purpose a flexible leafspring 70 is provided carrying a plurality, here illustrated as three, independently adjustable ball elements 72. The ball elements 72 are dimensioned to be received in the ends of tooth spaces of the work gear W as well illustrated in FIGS. 4 and 5. In the event that initial contact between the leading ball element 72 and a tooth space of the gear results in interference, the leafspring 70 yields to permit continued movement of the work gear W.

Figure 5:
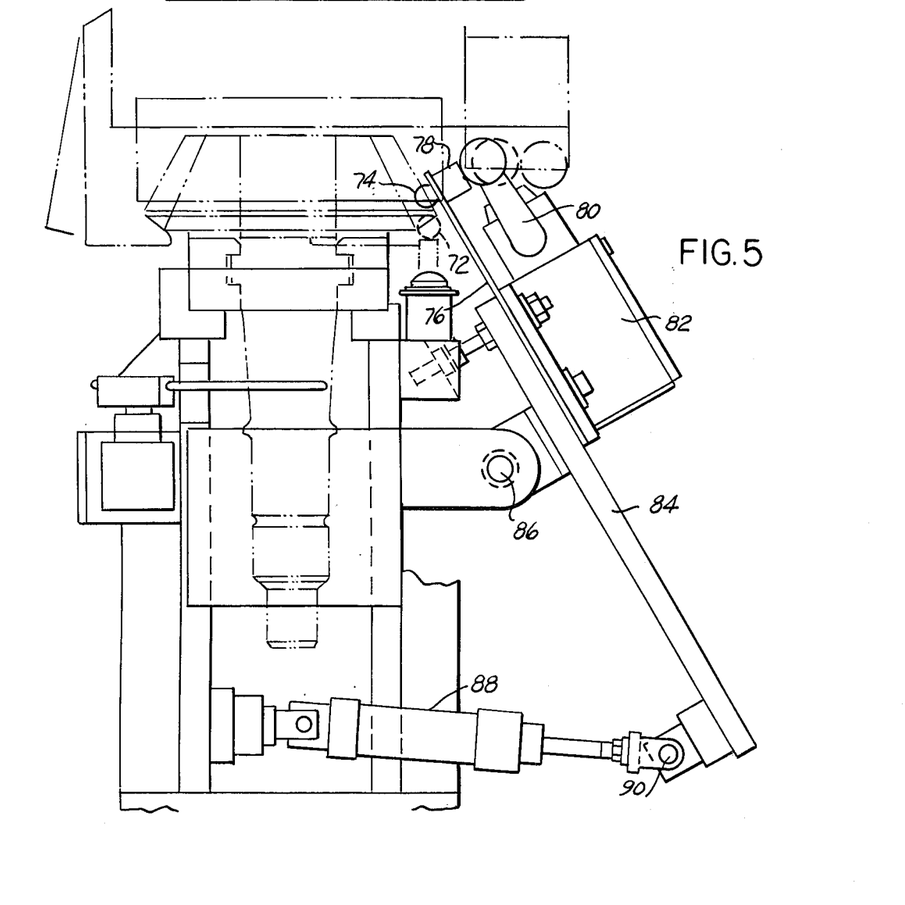
FIG. 5 is a detailed elevational view showing apparatus for checking orientation of the work gear.

As soon as the work gear has arrived at its final position determined by engagement with the abutment 62, its rotational position is tested by downward movement of a ball element 74 as best seen in FIG. 5. Ball element 74 is carried on a yieldable leafspring 76 and includes a switch actuator 78 engageable with an arm portion 80 of a limit switch 82. Leafspring 76 is fixed to an arm 84 which is pivoted as indicated at 86, movement of which is provided by a piston and cylinder device 88, the piston of which is pivotally connected as indicated at 90 to the end of the arm 84. If the ball element 74 fails to enter fully into a tooth space, limit switch 83 is actuated and further automatic cycling of the machine is prevented until the malfunction has been corrected.

Figure 7:
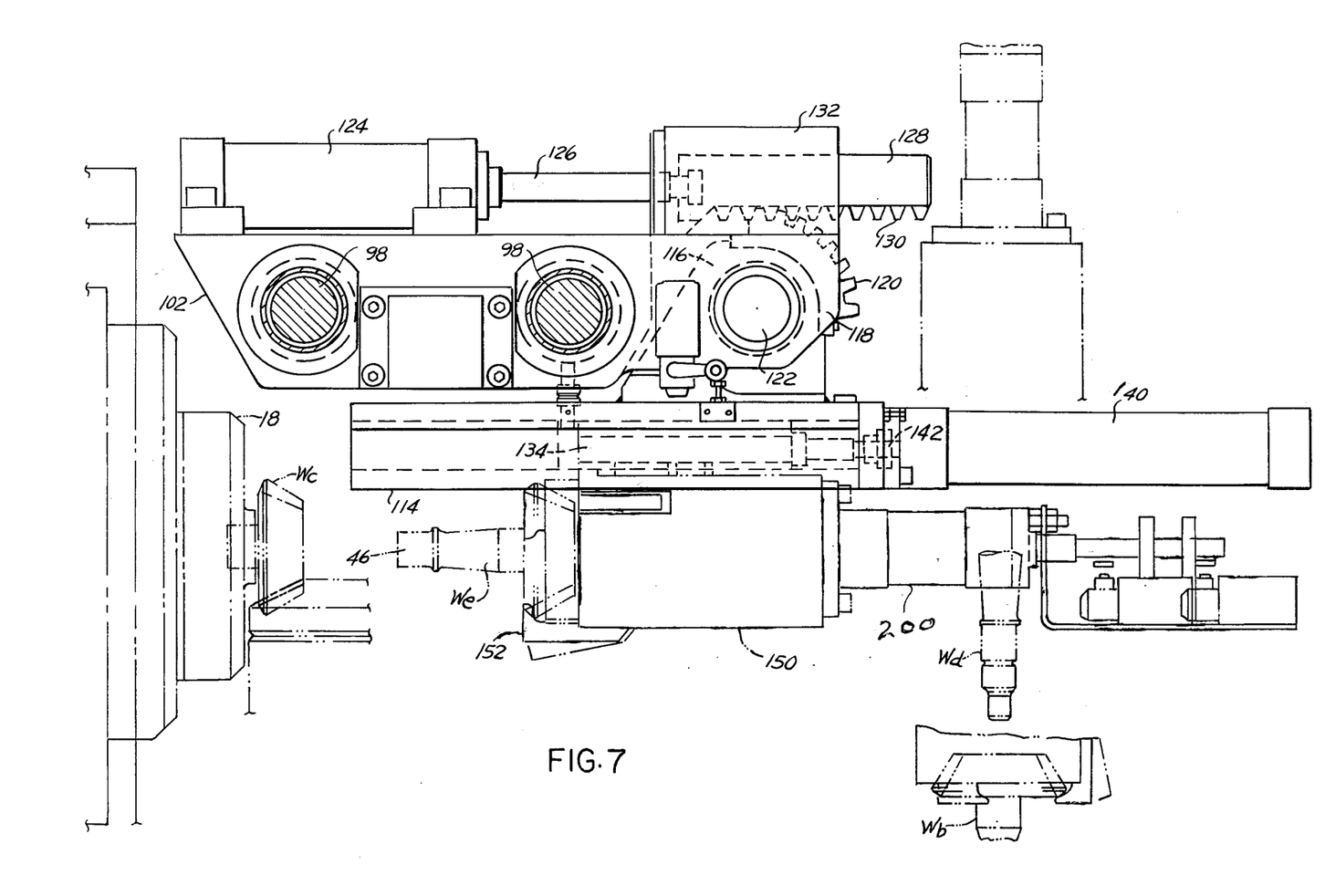
FIG. 7 is a side elevational view of the loading and unloading mechanism.
Figure 8:
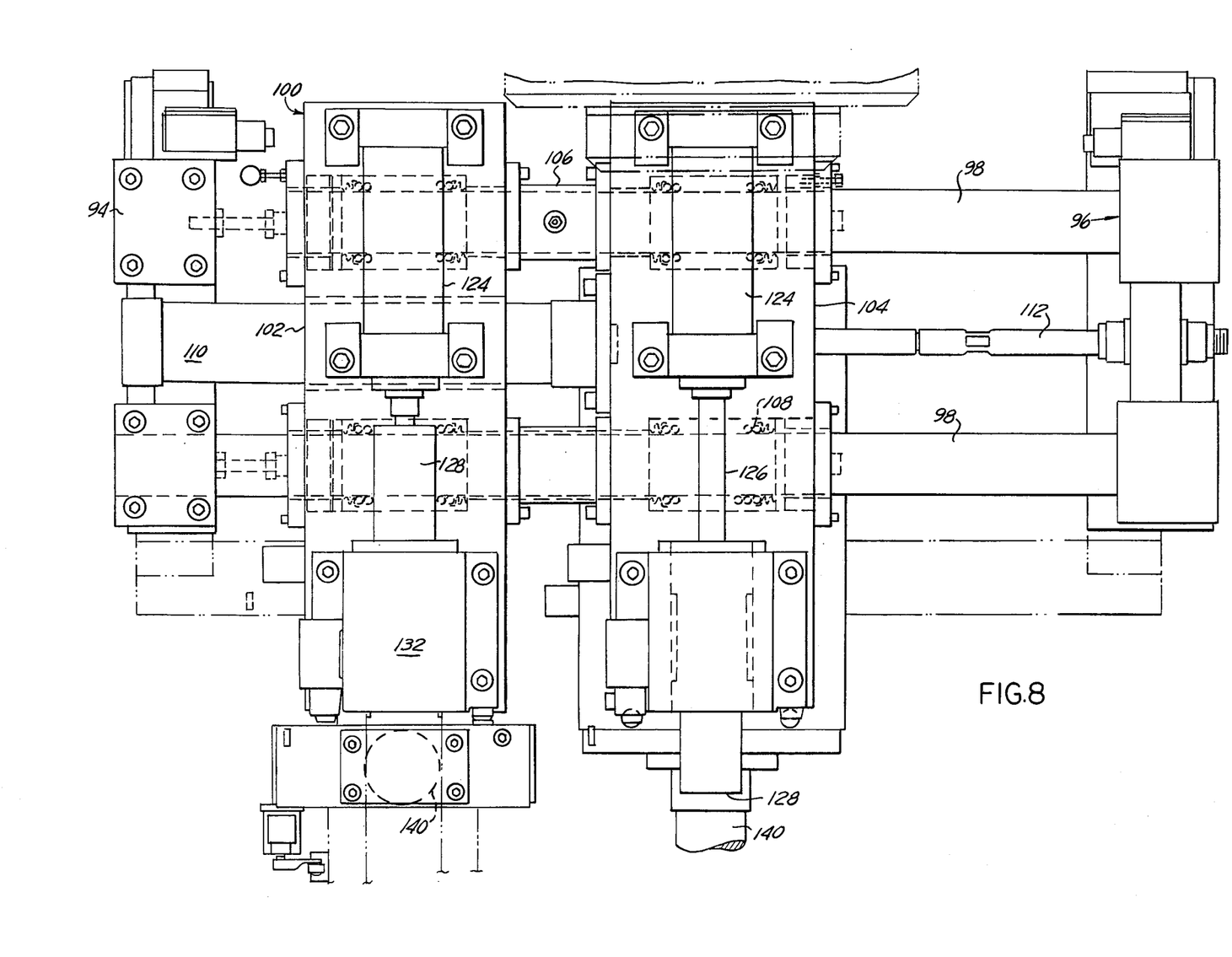
FIG. 8 is a plan view of the loading and unloading mechanism.

Referring now to FIGS. 6–8 there is illustrated the specific mechanism for transferring work gears W sequentially from the preliminary loading position Wb to a working position Wc in which the stem of the work piece is gripped within a collet 18 and, after the rolling operation, removed from the collet and deposited on discharge conveyor mechanism subsequently to be described.

A pair of spaced apart stanchions 94 and 96 are provided between which extend a pair of support rails 98. Longitudinally slidable on the rails 98 between two limiting positions is a carriage indicated generally at 100 and comprising separate but rigidly interconnected heads, a loading head 102 and an unloading head 104. These heads are interconnected by coupling sleeves 106. Suitable bearings, here illustrated as ball bearings 108 are provided, and a piston and cylinder device 110 is provided which is coupled to the stanchion 96 by rod 112.

The loading head 102 and the unloading head 104, and structure carried thereby, is substantially identical and only one of the heads and associated structure will be described in detail.

Referring now to FIG. 7 it may be assumed that the head illustrated as slidable longitudinally on the rails 98 is the loading head 102. Carried by the head 102 is a pivot support 114 which includes an upwardly extending arm portion 116 provided with an arcuate sector 118 provided with teeth 120. The support 114 is pivoted to head 102 by a pivot shaft 122.

Mounted on the top of the head 102 is a hydraulic cylinder 124 having a piston rod 126 connected to a longitudinally slidable rack 128 having teeth 130 meshing with the teeth 120 of the sector 118. The rack 128 is longitudinally slidable in a guide housing 132.

The pivot support 114 carries a slide 134, the slide connection including gibs 136 and 138, which as best seen in FIG. 6 provide for horizontal movement of the slide 134 when the head 104 is in the position illustrated in FIG. 6.

Movement of the slide 134 relative to the pivoted supported 114 is provided by the piston and cylinder device 140 which includes a connection 142 thereto.

Adapted to be fixed to the slide 134 is a work gripping tool 150 details of which will subsequently be described. For the time being it is sufficient to note that the work gripping tool 150 includes a plurality of jaws 152 which are pivoted toward and away from each other to grip the head of the work gear W. As seen in FIG. 7, the loading mechanism, as will subsequently be described, positions the work gripping jaws 152 directly above the work gear in its position Wb. At this time the slide is moved downwardly so that the jaws pick up the work gear, after which the slide is raised vertically to temporarily locate the work gear in the position Wd. At this time by suitable operation of the hydraulic cylinder 124, the pivoted support 114 is swung about the axis of pivot shaft 122 to bring the work gear to the position indicated at We, at which time its stem 46 is parallel to the axis of the chuck 18. The carriage 100 is in position such that the loading head 102 is in registration with the temporarily located position of the work gear W as determined by the abutment and orienting fingers. This position is to the left or toward the intake side of the machine from the center-line of the chuck 18. At the appropriate time after the work gear has been elevated out of position in its preliminary loading station, the entire carriage is shifted to the right or downstream to bring the loading head into alignment with the chuck, at which time the stem comes into axial alignment with the chuck for insertion therein.

At this time operation of the hydraulic cylinder 140 advances the slide 134 to insert the work gear into the chuck where it occupies the previously described position We.

After the work support tooling 150 has inserted the work gear into the chuck, where it is hydraulically clamped, the clamping jaws are released as will subsequently be described and the slide 134 and tooling 150 are withdrawn as seen in FIG. 7. After this, the knee is elevated and the gear rolling cycle initiated and completed.

At this time the carriage is reversely moved to bring the unloading head 104 into position in front of the chuck. As soon as the gear rolling cycle is completed the work support tooling 150 on the unloading head is advanced and the clamping jaws engage the finished work gear. Thereafter, the slide which supports the work support tooling is retracted to withdraw the finished work gear from the chuck which is of course actuated to release the gear, after which the pivoted support 114 is pivoted through 90° to swing the finished work gear into position with its stem extending downwardly.

In the meantime, the loading head 102 has been moved into registration with the preliminary loading station and the mechanism is operated as previously described to pick up the next succeeding work gear.

Figure 9:
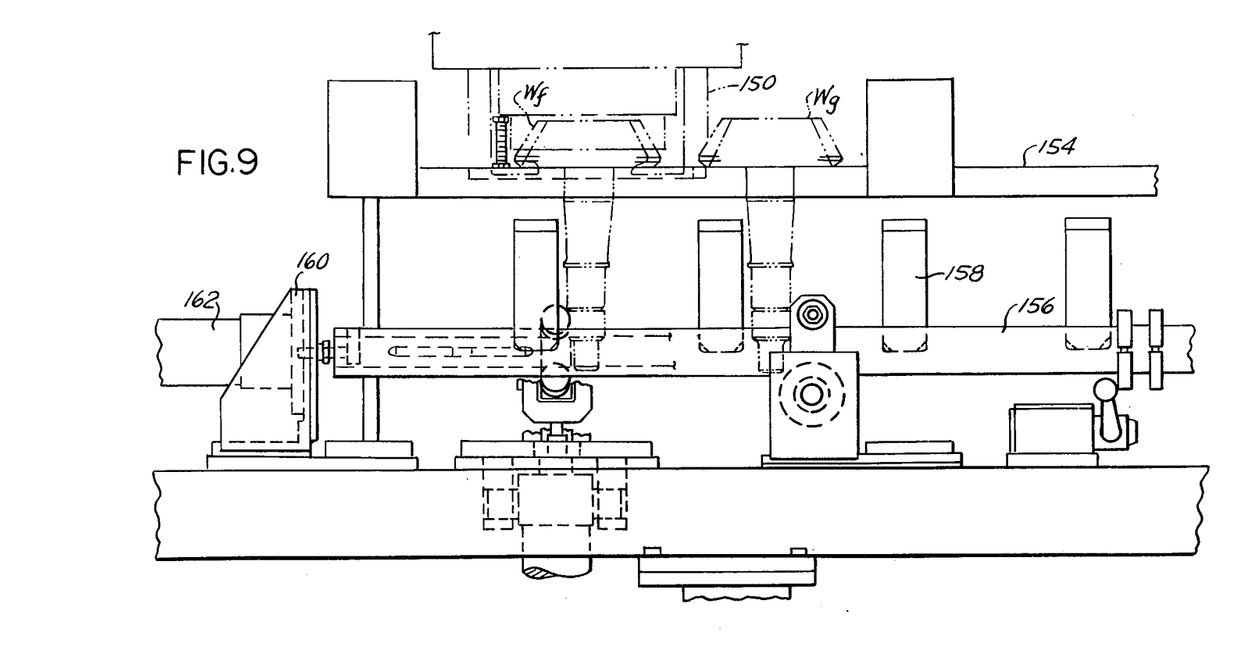
FIG. 9 is an elevational view of the discharge end of the loading mechanism.
Figure 10:
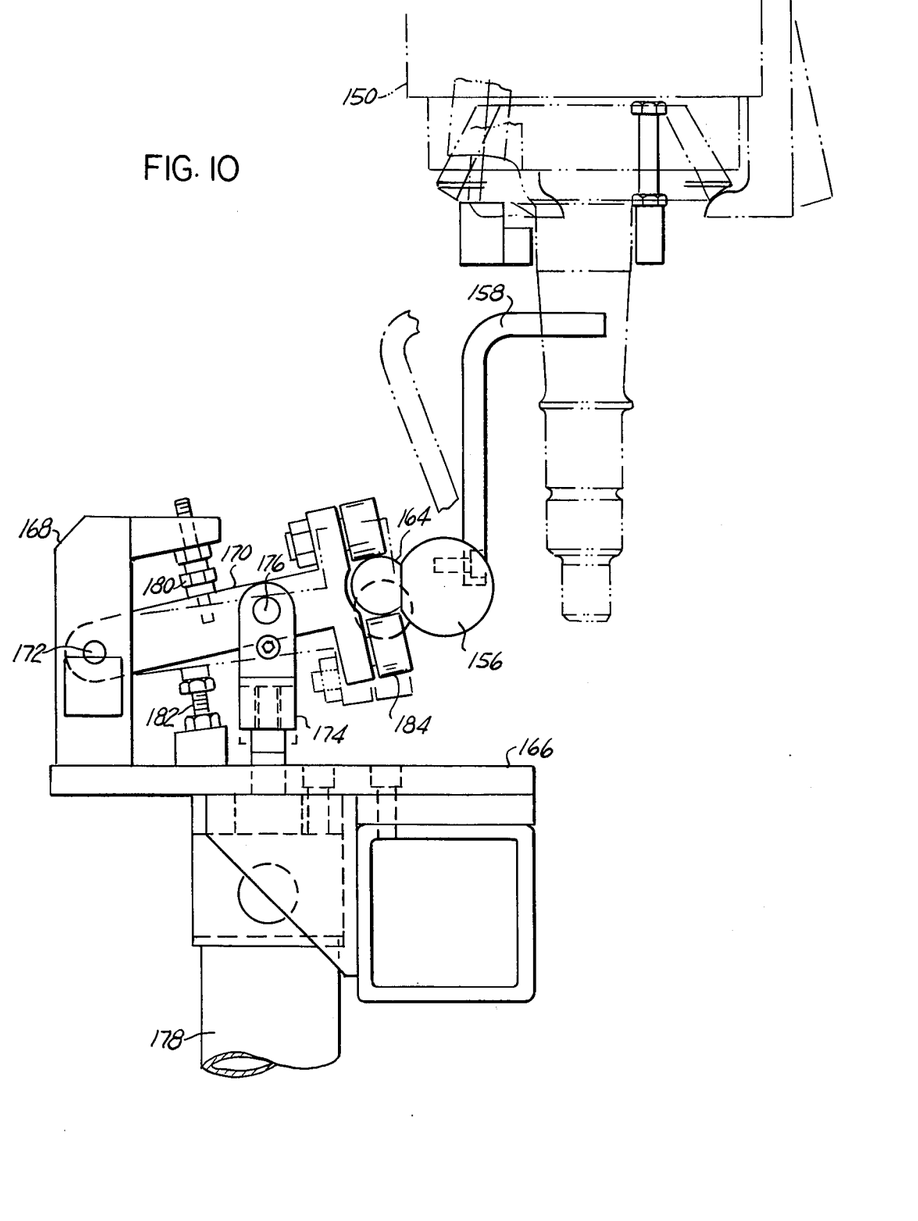
FIG. 10 is a side elevation of the structure shown in FIG. 9.

Reference is now made to FIGS. 9 and 10. As seen in FIG. 9 the work support tooling 150 on the head 104 moves the finished work piece downwardly to the position designated Wf, at which time the underside of its toothed portion rests on guide rails 154 with its stem projecting downwardly. Means are provided for advancing the finished work piece successively from the position Wf through the position Wg., etc., until they reach a collecting or discharge zone at the right hand end of the rails 154.

The means for advancing the finished gears while maintaining them out of contact with each other, comprises an elongated rod 156 having a plurality of angularly shaped feeding fingers 158 thereon. The rod 156 is mounted for limited rotation and for horizontal reciprocation, the latter being imparted to the rod by a piston and cylinder device indicated at 162 supported by bracket 160. In order to provide for oscillation of the rod 156 to move the fingers 158 into and out of engagement with the stem portions of the pinions, the rod is provided with an elongated cylindrically formed actuator 164. Stationary support structure 166 includes a pivot support 168 to which an arm 170 is pivoted as indicated at 172. Connected to the arm 170 intermediate its ends is an actuator yoke 174 pivoted to the arm as indicated at 176 and vertically movable by a piston and cylinder device indicated at 178. Movement of the arm 170 is limited by adjustable abutments 180 and 182. At its free end arm 170 is provided with a pair of rollers 184 engaging opposite sides of the elongated cylindrically formed element 164. Accordingly, as the arm 170 is raised or lowered, the rod 156 is correspondingly oscillated about its axis and the multiplicity of fingers 158 thereon are movable between the full and dotted line positions indicated in FIG. 10. It will of course be understood that the longitudinal reciprocation of the rod by the hydraulic cylinder device 162 is permitted by virtue of the engagement between the rollers 184 and the cylindrically formed element 164.

Figure 11:
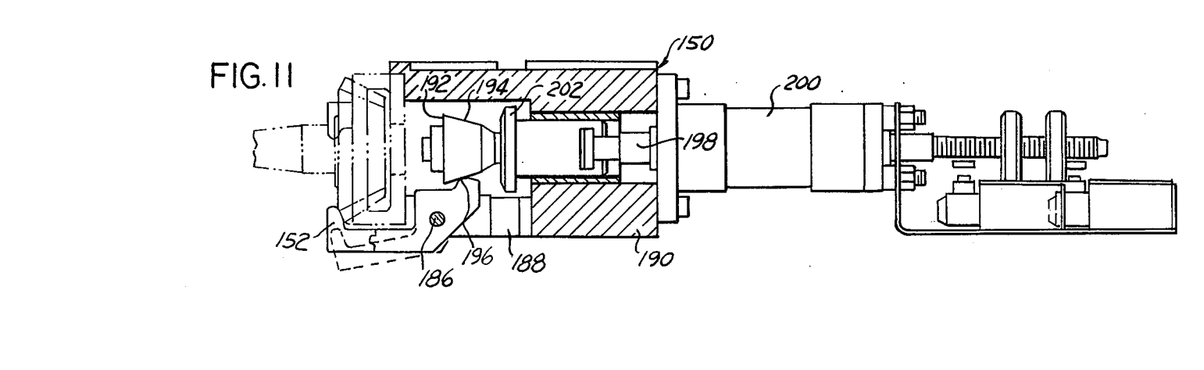
FIG. 11 is an elevational view, partly in section, of the carrier.

Reference was previously made to the work gripping tooling 150 and this tooling is illustrated in some detail in FIG. 11. Here, it will be observed that the pivoted jaws 152 are pivoted as indicated at 186 in slots 188 provided in a housing 190. Longitudinally movable within the housing 190 is an actuating cam device 192 having a conically formed cam surface 194 which is engageable with projections 196 formed on the inner end of the jaws 152. Accordingly, as viewed in FIG. 11, movement of the camming device to the right results in inward movement of the work engaging portion of the jaws 152 and accordingly, results in positive clamping engagement of the work piece in the jaws.

The camming device 192 is connected by the piston 198 to a hydraulic cylinder 200 which may be energized to move the camming device 192 either to the left or to the right. The camming device includes an annular flange 202 shaped to engage the inner ends of the jaws 152 when the camming device is moved to the left. It will be observed that the sequence of action from the clamping position shown in full lines is first to release the jaws by leftward movement of the cam 194, after which engagement between the flange 202 and the inner ends of the jaws results in positive retraction of the jaws with the dotted line position indicated in FIG. 11.

For completeness the operation of the machine and loading mechanism through a single cycle will be described.

First, the operation of the machine independent of the transfer and loading mechanism will be described. The machine comprises the frame including the column 12, the base portion 14 and the vertically movable knee 22. The work support spindle 116 has a collet at its outer end to receive the stem of a work pinion in position generally overlying the knee. The spindle 16 is freely rotatable but may be clamped in any random position by operation of a friction brake 20. The knee carries the vertical tool spindle 26 which is provided with locating means such as the shot bolt 30 for locating the tool and its spindle in precisely predetermined angular position. The knee 22 is provided with a motor 28 connected to the tool spindle 26 and the entire knee is movable vertically by a hydraulic feed piston and cylinder device 24.

In operation, the knee is in downward stationary position with the tool spindle 26 locked therein in precisely predetermined angular position. At this time a work gear is positioned at a preliminary loading station where its stem extends downwardly at a fixed location and in which its rotational position is precisely predetermined with reference to that of the tool T. At this time the work gear is picked up, swung through 90°, moved into alignment with the collet 18, and the stem is inserted in the collet where it is positively clamped for subsequent operation. At this time, while both the tool spindle 26 and the work spindle 16 are maintained against rotation, the knee 22 is moved vertically to bring the teeth of the tool T into mesh with the teeth of the work gear W. After the teeth have been properly meshed without interference, the shot bolt is removed and the brake is released, at which time the motor 28 is energized and pressure is continuously applied through the hydraulic cylinder 24 until the work gear has been roll-finished to predetermined dimensions.

The operation of the mechanism for initially locating work gears serially in the preliminary loading station, for shifting them into the chuck or collet, for removing a finished gear therefrom, for depositing the finished gear on discharge rails, and for advancing the finished gears along the discharge rails, will be briefly described.

An unfinished work gear is advanced along the input chute 40 and thence is advanced by the pusher 54 along the rails 61 to the preliminary loading station, where the gear occupies the position designated Wb in FIG. 2. As the gear is advanced horizontally along rails 61, balls 72 engage in tooth spaces thereof and insure that in the preliminary loading position the gear occupies a precisely predetermined rotational position which will insure inter-meshing between the teeth of the gear and a gear-like tool without interference.

The loading and transfer mechanism comprises the carriage 100 composed of loading head 102 and unloading head 104. The carriage at this time is shifted to a position such that the loading head 102 overlies the preliminary loading station and the pivoted support 114 is in position such that the slide carried thereby is movable vertically. At this time the slide is moved downwardly to bring the clamping jaws of the work support tooling 150 into engagement with the work gear, after which the slide is moved vertically and the pivoted support 114 is swung to bring the stem of the pinion horizontal. During this interval the carriage is shifted longitudinally to bring the loading head into alignment with the chuck 18 and thereafter the slide is advanced to insert the stem of the gear into the collet. The collet is clamped and the gear finishing cycle commences and is carried through to completion as just described.

After the clamping jaws of the loading head are released, the carriage is moved back to bring the loading head into registration with the next succeeding gear occupying the preliminary loading station and the slide and work engaging tooling 150 on the unloading head 104 are positioned in alignment with the work gear in the chuck. When the cycle is completed the work spindle is braked in whatever position it happens to occupy and the knee is moved downwardly to disengage the tool and gear. At this time the shot bolt is activated and engages to fix the tool spindle in precisely located angular position.

The slide on the unloading head carrying the work engaging tooling 150 is now advanced, and the jaws actuated to grip the finished work gear, after which the slide is retracted and the pivoted support 114 is swung through 90° to move the finished work gear into position with its stem extending downwardly. At this time the slide on the unloading head is moved downwardly and deposits the finished gear on the exit rails 154. The cylinder 200 of the work support tooling 150 is actuated not only to release the jaws 152, but to positively move them to clearance position, leaving the finished work gear on the rails. This gear, as well as previous gears, is advanced step-by-step by timed oscillation and axial reciprocation of the rod 156.

The entire loading and unloading cycle is expedited since a work gear is oriented and picked up preparatory to insertion in the chuck during the rolling cycle. At the same time the unloading head is positioned so that it may be moved into work gear removing position immediately upon downward movement of the knee, thus only minimal time is lost between successive gear rolling operations and a high production accordingly results.

What I claim as my invention is:

1. A machine for finish-rolling bevel pinions having a shank extending axially from one side thereof, comprising
   a frame including a column portion and a base portion,
   a knee,
   means mounting said knee for vertical movement in said base laterally of said column,
   a horizontal work spindle in said column having an outer end portion overlying said knee,
   a collet at the outer end of said work spindle operable to grip the shank of a work gear and to hold it against rotation relative to said work spindle,
   means mounting said work spindle for rotation,
   a brake associated with said work spindle and operable to hold said work spindle against rotation in any random position,
   a vertical tool spindle in said knee for carrying a tool in the form of a bevel gear substantially conjugate to the work gear and for preventing relative rotation between said tool spindle and the gear-like tool thereon,
   locating means acting between said knee and tool spindle effective to stop said tool spindle in a precisely located angular position,
   a motor carried by said and connected to one of said spindles for driving said one spindle in rotation,
   pressure applying means acting between said base and said knee for raising said knee to apply pressure of metal forming intensity between the teeth of the gear and tool,
   positioning means comprising a horizontal trackway along which work gears are advanced serially with the shank extending downwardly, fingers disposed along the trackway in position to enter into spaces between the teeth of the gears for positioning work gears serially at a preliminary loading station with the teeth thereof in precisely located angular position,
   and transfer means for transferring said work gears serially from said preliminary loading station to move the shanks thereof into said collet without disturbing the angular position thereof.

2. A machine as defined in claim 1 in which said pressure applying means comprises hydraulic piston and cylinder means.

3. A machine as defined in claim 1 in which said locating means comprises shot bolt means.

4. A machine as defined in claim 1 in which said transfer means comprises a horizontally movable carriage having a loading head and an unloading head, a separate slide support on each of said heads, pivot means mounting said slide supports to said heads for independent tilting movement about a single axis parallel to the direction of movement of said carriage, a separately actuatable slide on each of said slide supports, and work gripping jaws on each of said slides.

5. Transfer mechanism for transferring a work piece in the form of a gear having a stem extending laterally from one side thereof from a preliminary locating station in which the gear is positioned with its stem extending in a predetermined direction and with a precisely located rotational position with respect to the teeth thereof to a position in which its stem is inserted into a collet whose axis is located at a substantial predetermined angle to the axis of the gear when the gear is in said preliminary loading station and for removing a finished gear from said collet and depositing it onto a discharge chute with its stem extending in the same direction as when in said preliminary loading position, comprising
   a carriage having a loading head and an unloading head movble between limiting positions,
   a separate slide support on each of said heads,
   pivot means mounting said slide supports for independent tilting movement on said carriage,
   a separately actuatable slide movably mounted on each of said slide supports,
   and separately actuatable work gripping jaws on each of said slides.

* * * * *